March 24, 1925.

F. JOHNSTON

GAUGE

Filed Sept. 2, 1924

1,530,832

Franklin Johnston, Inventor

Patented Mar. 24, 1925.

1,530,832

UNITED STATES PATENT OFFICE.

FRANKLIN JOHNSTON, OF MOLINE, ILLINOIS.

GAUGE.

Application filed September 2, 1924. Serial No. 735,440.

*To all whom it may concern:*

Be it known that I, FRANKLIN JOHNSTON, a citizen of the United States, residing at Moline, in the county of Rock Island and State of Illinois, have invented certain new and useful Improvements in Gauges, of which the following is a specification.

This invention relates to gauges, and more particularly to an apparatus for properly alining the front wheels of a motor vehicle.

An object of the invention is the provision of a device by means of which the cant of the front wheels and the camber of the axle may be readily determined.

A further object of the invention is the provision of a simple apparatus by means of which a cant of the front wheel of a motor vehicle may be determined without removing the wheel from the vehicle and the two wheels set at the same angle.

Figure 1:
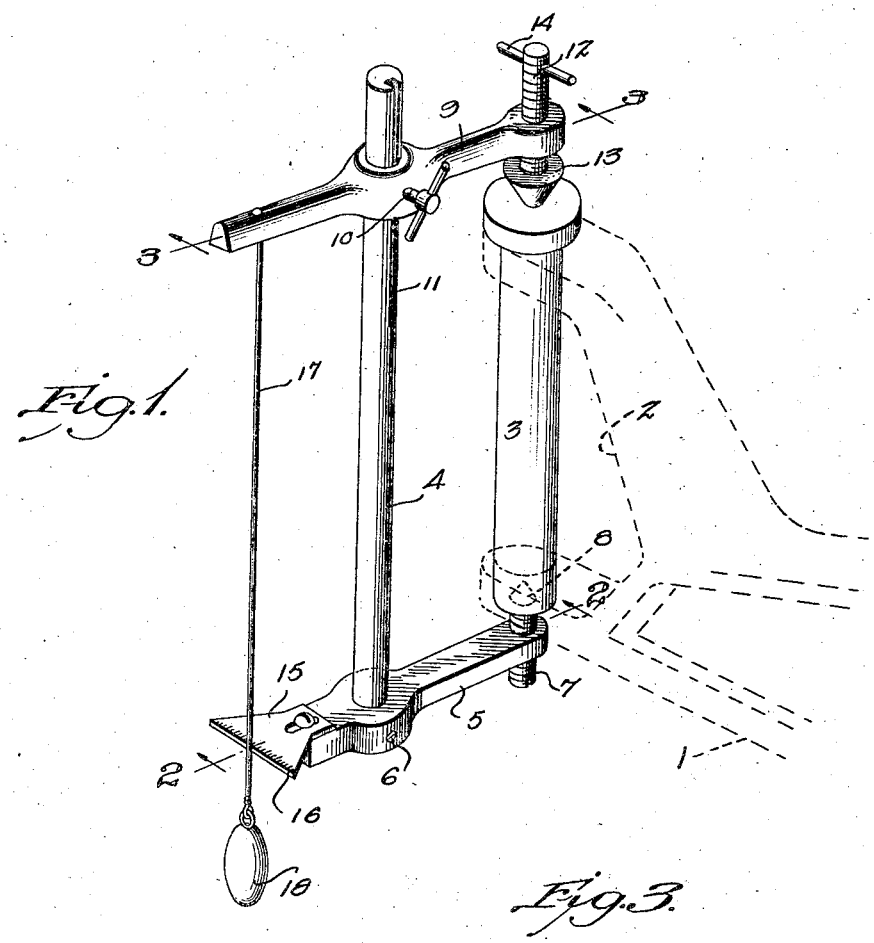
Figure 2:
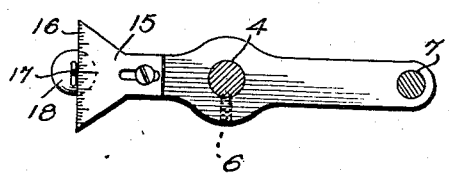
Figure 3:
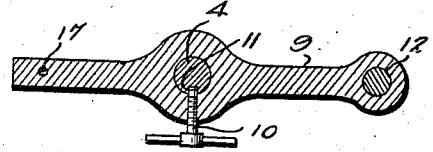

In the accompanying drawings, I have shown one embodiment of the invention. In this showing:

Figure 1 is a perspective view of a portion of the front axle showing the invention applied, Figure 2 is a horizontal sectional view on line 2—2 of Figure 1, and, Figure 3 is a similar view on line 3—3 of Figure 1.

Referring to the drawings, the reference numeral 1 designates one end of the front axle of a motor vehicle. The axle is of the usual construction and is provided with a yoke 2 for the reception of a spindle bolt 3. The device forming the subject matter of the present invention consists of a vertical supporting rod 4, having a plate 5 secured to the lower end thereof. As shown (see Figure 2), the plate is held in position by means of a set screw 6. One end of the plate is provided with a threaded opening, adapted to receive a screw 7 and this screw is provided with a point or cone-shaped upper end 8, which is adapted to engage the bottom of the spindle bolt. The rod 4 is further adapted to support a laterally extending member 9 which is capable of adjustment toward and away from the plate 5. As shown, this member is provided with a threaded opening adapted to receive a bolt 10 and the end of the bolt enters a key way 11 in the vertical member 4 to retain the lateral members 5 and 9 in alinement with each other. One end of the member 9 is provided with a threaded opening for the reception of a threaded rod 12, and a cone 13 is mounted on the lower end of this rod. The upper end of the rod may be provided with a cross pin 14, to permit adjustment of the rod. The lateral members 5 and 9 extend beyond the vertical member 4 and the lower member 5 is provided with a gauge 15, having suitable indicia on its outer edge, as indicated at 16. A plumb line 17 is attached to the upper member 9 and is provided with a weight 18 on its lower end.

In operation, the device is applied to a vehicle in the manner illustrated in Figure 1 of the drawings, without removing the wheel for the purpose of determining the cant of the wheel. As shown, the horizontal arms 5 and 9 extend at right angles to the axle. The arm 9 is first adjusted to the length of the spindle bolt and the thumb screw 10 tightened. The screws 7 and 12 are then inserted in the spindle bolt centers and the upper screw or rod 12 turned until the device is reasonably tight. The gauge 16 is adjusted longitudinally of the arm 5 until the plumb line 17 touches it and the device is then applied to the other wheel and the wheel adjusted until the line will touch the gauge when in the same position.

To test the camber, the wheel is removed and the apparatus applied in the same manner as heretofore described, except that it is arranged in alinement with the axle or at right angles to the position shown in the drawings.

It is to be understood that the form of my invention herewith shown and described is to be taken as a preferred example of the same, and that various changes in the shape, size, and arrangement of parts may be resorted to without departing from the spirit of the invention or the scope of the subjoined claims.

I claim:

1. In a device of the character described, a supporting rod, an arm secured to the lower end of said rod, a second arm adjustably mounted on said rod, threaded pins arranged in said arms in alinement with each other and adapted to engage, respectively, the upper and lower ends of a spindle bolt in the front axle of a vehicle, and support said rod parallel to said spindle bolt, a plumb line carried by said upper arm, and a gauge mounted on said lower arm.

2. In a device of the character described, a supporting rod, an arm secured to the lower end of said rod, a second arm adjustably mounted on said arm, threaded pins arranged in said arms in alinement with each other and adapted to engage, respectively, the upper and lower ends of a spindle bolt in the front axle of a vehicle, and support said rod parallel to said spindle bolt, a plumb line carried by said upper arm, a gauge mounted on said lower arm, said gauge being provided with an elongated slot, and a fastening element passing through said slot and entering said arm to permit adjustment of said gauge.

3. In a device of the character described, a supporting rod, an arm secured to the lower end of said rod, said rod being provided with a longitudinally extending key-way adjacent its upper end, an upper arm mounted on said rod, a set screw carried by said arm and adapted to be received in said key-way, threaded pins carried by said arms in alinement with each other and adapted to engage, respectively, the upper and lower ends of a spindle bolt in the front axle of a vehicle, and support said rod parallel to said spindle bolt, said pins being provided with pointed ends, a plumb line carried by said upper arm, and a gauge carried by said lower arm.

In testimony whereof I affix my signature in presence of two witnesses.

FRANKLIN JOHNSTON.

Witnesses:
  E. H. HENSTRUM,
  W. E. JACKSON.